Figure 4:
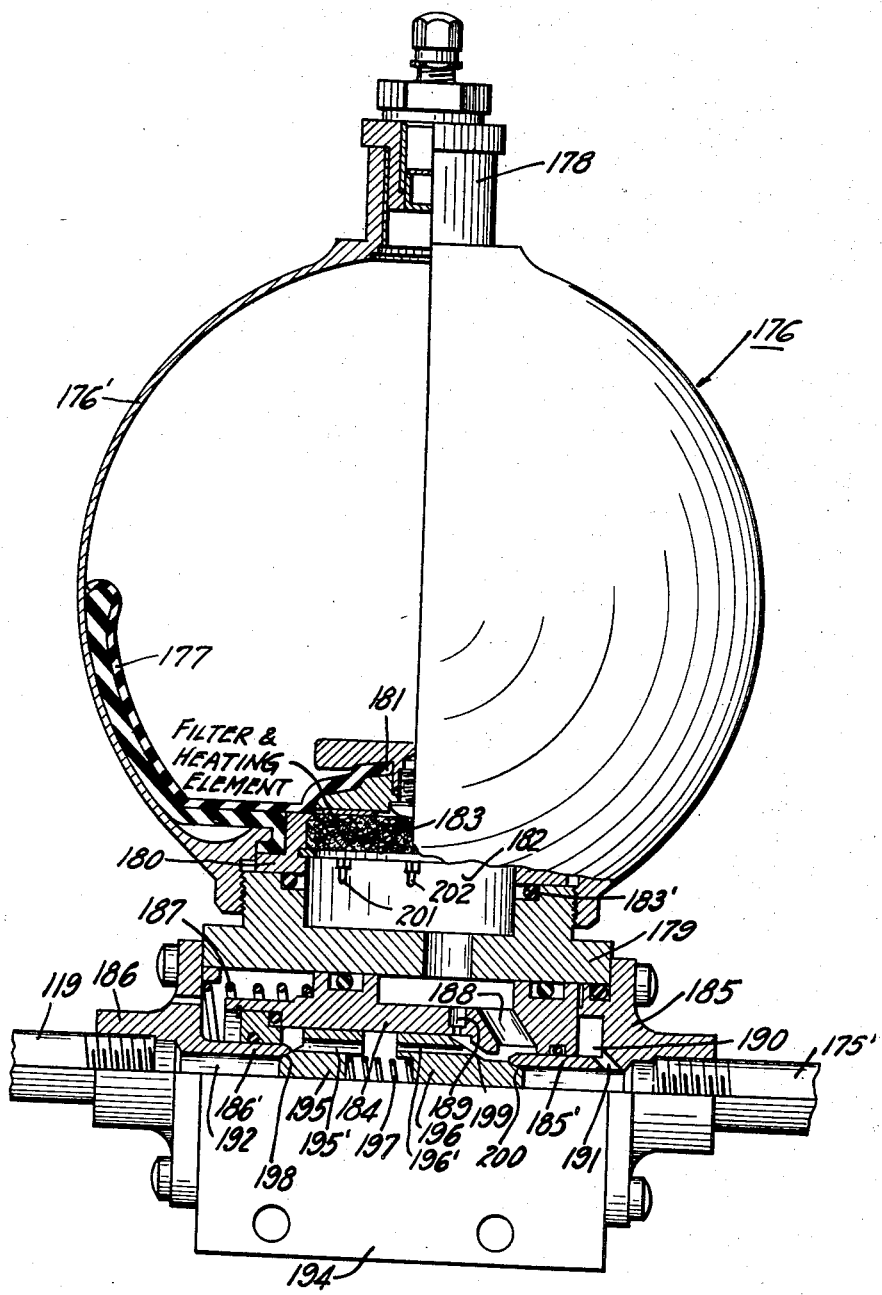

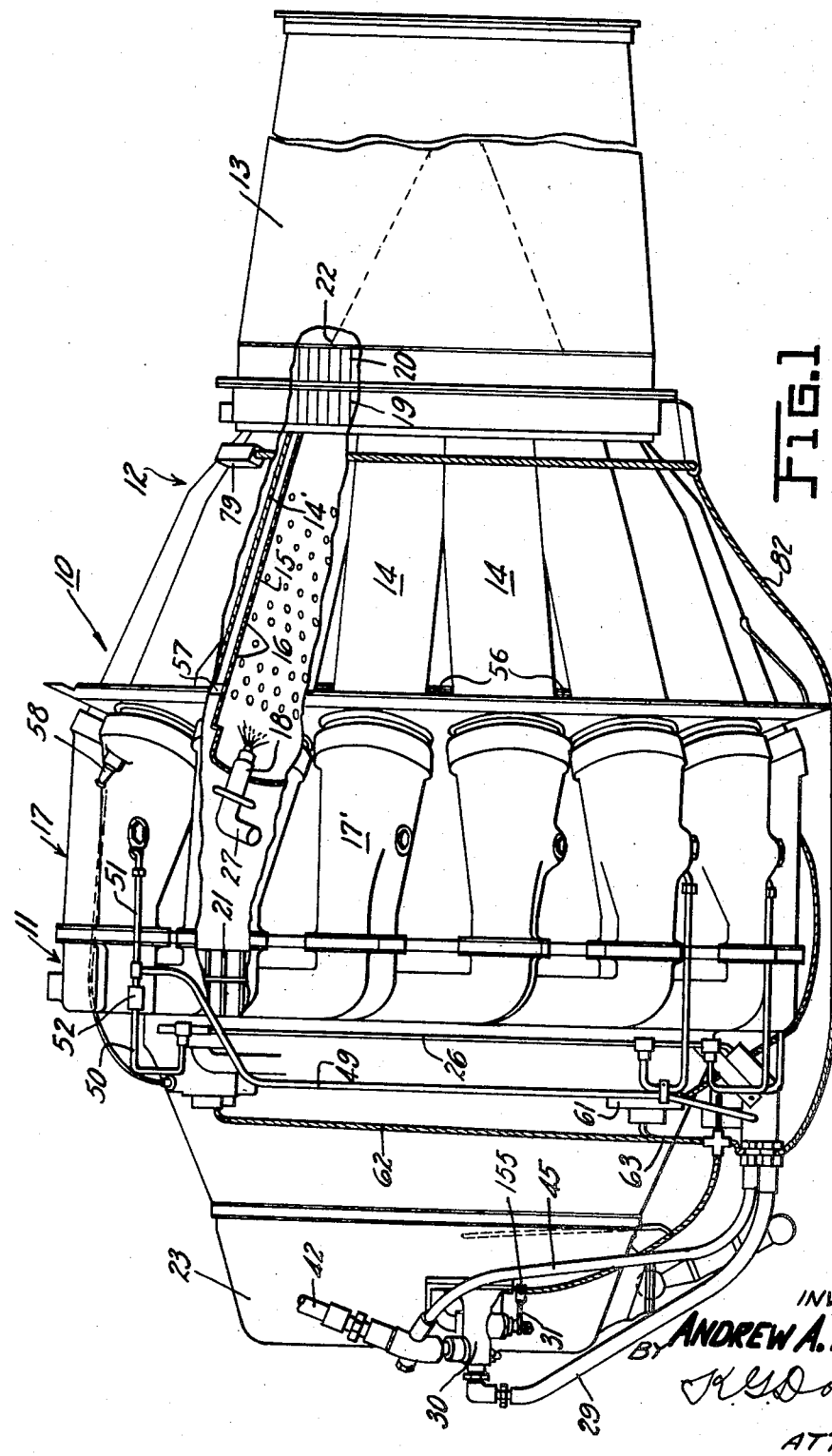

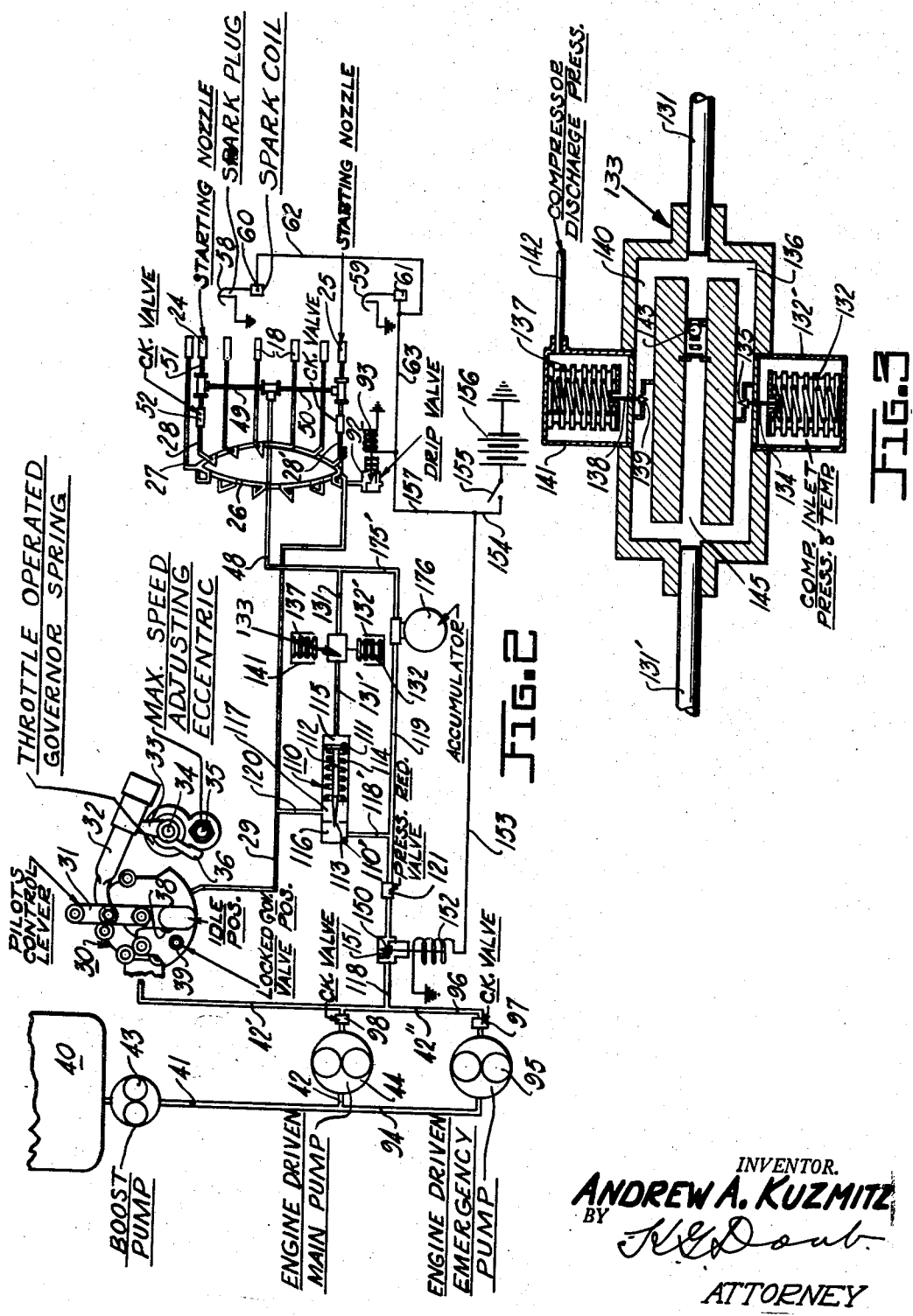

ically disposed combustion chambers 14, each comprising an outer tubular shell 14' in which is mounted a flame tube or burner 15, spaced from the outer shell 14' and formed with a series of openings 16 for admitting compressed air into the tube. An air adapter or header section, generally indicated at 17, is detachably connected to the front end of the burner assembly; it comprises a plurality of air adapters 17', one for each combustion chamber, which direct air under pressure to said chambers, where it enters the flame tubes 15 and mixes with the fuel discharged from burner nozzles 18 to effect combustion, the expanded air and products of combustion being discharged from the burner tubes through stator blades forming part of a nozzle diaphragm assembly 19 and then through the blades of a turbine 20, to effect rotation of the latter.

United States Patent Office

2,854,817
Patented Oct. 7, 1958

2,854,817
STARTING FUEL CONTROL SYSTEM CONTAINING A FUEL STORAGE DEVICE FOR GAS TURBINE ENGINES

Andrew A. Kuzmitz, South Bend, Ind., assignor to Bendix Aviation Corporation, South Bend, Ind., a corporation of Delaware Original application February 24, 1947, Serial No. 730,622, now Patent No. 2,667,742, dated February 2, 1954. Divided and this application January 31, 1952, Serial No. 269,297

4 Claims. (Cl. 60—39.14)

This application constitutes a division of my copending application Serial No. 730,622, filed February 24, 1947, now Patent No. 2,667,742, issued February 2, 1954.

As in the parent case, the instant invention is primarily concerned with a starting system for gas turbine engines adapted for powering aircraft, as where the engine functions as a straight jet or turbojet engine, a turbo-prop engine, or combines the functions of a jet engine and a propeller type engine. Also, since the herein disclosed system is capable of carrying out the objects recited in said parent case, they are repeated below, viz:

To obtain pressure at the fuel discharge nozzles during starting sufficient to insure good spray atomization at relatively low cranking speeds;

To provide a fuel feed and coordinated ignition system wherein all or a major portion of the fuel sprayed into the burner system during starting will be ignited so that a minimum of raw fuel will enter the tail cone before combustion takes place in the entire burner system;

To provide a starting system for engines of the above type which will produce ignition at the burners and increase the engine speed or R. P. M. to a self-sustaining value in as short a time as possible without exceeding safe combustion temperatures;

A starting system capable of making safe restarts in flight in the event of flame blowout or dieout with a minimum of attention or manual effort by an operator or pilot;

A starting system which will prevent too rich a fuel flow after ignition is obtained in the entire group of burners, with consequent increase in temperature in the burner system beyond a safe value;

A starting system wherein starting fuel is initially conducted directly to the point of ignition of one or more pilot burners without entering and accumulating in a manifold ring or other fuel receiving device common to all burners;

An ignition system coordinated with a fuel supply system to obtain safe and efficient starting under all conditions of operation; and To generally improved starting systems for gas turbine engines.

The foregoing and other objects and advantages will become apparent in view of the following description taken in conjunction with the drawings, wherein:

Figure 1 is a view in elevation and partly broken away of a gas turbine engine for aircraft equipped with a starting system in accordance with the invention.

Figure 2, a schematic view of the starting system of Figure 1.

Figure 3, a detailed sectional view of a pressure and temperature compensating unit forming part of the system; and Figure 4, a view in sectional elevation of an accumulator for use in the system.

The engine shown for the purpose of illustration is of the multiple burner type having an electrical ignition system, but it will be understood that while the invention is primarily adapted for use with such type of engine, it is not necessarily limited thereto. Thus, the teaching of the invention may, in certain respects at least, be equally applicable to gas turbine engines having a single or undivided annular burner chamber, and this may also be true in regard to the ignition system, which could under certain aspects of the invention be other than electric; for example, it could be by means of the so-called starting torch or by a pilot flame.

Referring first to Figure 1, a gas turbine power plant in the form of a turbo jet propulsion engine is generally indicated at 10; in general, it comprises a compressor rotor assembly 11, a turbine rotor assembly 12 and an exhaust unit or tail cone 13, to which is connected the conventional tail pipe and discharge nozzle reaction jet assembly, not shown.

The turbine rotor assembly includes a plurality of annularly disposed combustion chambers 14, each comprising an outer tubular shell 14' in which is mounted a flame tube or burner 15, spaced from the outer shell 14' and formed with a series of openings 16 for admitting compressed air into the tube. An air adapter or header section, generally indicated at 17, is detachably connected to the front end of the burner assembly; it comprises a plurality of air adapters 17', one for each combustion chamber, which direct air under pressure to said chambers, where it enters the flame tubes 15 and mixes with the fuel discharged from burner nozzles 18 to effect combustion, the expanded air and products of combustion being discharged from the burner tubes through stator blades forming part of a nozzle diaphragm assembly 19 and then through the blades of a turbine 20, to effect rotation of the latter.

The compressor rotor assembly mounts a dynamic compressor 21, which may be either of the centrifugal type or the axial flow type, driven by the turbine 20 through suitable shafting, not shown, to force air under pressure into the air adapters or headers 17'.

The expanded air and products of combustion, after passing through the blades of the turbine 20, are discharged to the atmosphere through the tail cone and discharge or exhaust jet nozzle to effect propulsion of an aircraft in which the engine may be mounted. A diffuser 22 is usually mounted in the tail cone 13. Propulsion may also be effected, in whole or in part, by a propeller, not shown, which would be driven from the turbine 20.

The various accessories which go to make up the complete power plant 10 are mounted at the front of the engine on a suitable streamlined casing 23. Among these accessories is the coordinated fuel feeding and ignition system of the present invention, one form of which is diagrammatically shown in Figure 2.

The fuel system includes the discharge nozzles 18, Figure 1, also 24 and 25, Figure 2, to which fuel is supplied by way of a manifold ring 26 and a series of individual fuel lines 27 and 28, 28'. The nozzles 24 and 25 have been given separate reference numerals, since they also function as pilot or starter nozzles in a manner to be described. The manifold ring receives fuel from a main fuel conduit 29, having mounted therein a fuel control unit, generally indicated at 30, and which may be and preferably is substantially similar to that disclosed in the copending application of Frank C. Mock, Serial No. 716,154, filed January 13, 1946, now Patent No. 2,689,606, issued September 21, 1954. In Figure 2, only the control lever and coacting parts of the unit 30 are shown, since the particular type of control unit is a matter of choice and forms no essential part of the present invention. The parts shown include a control lever 31, having pivotally connected thereto the one end of a hollow link 32, the opposite extremity of said link being pivotally connected to a lever 33, secured on a shaft 34, which when rotated in a counter clockwise direction, compresses a governor spring, not shown, and thereby determines the setting of a fuel feed or governor valve, also not shown, which in turn determines the rate of fuel feed. A maximum speed adjusting eccentric, indicated at 35, is adapted to be contacted by an extension 36 of the lever 33 when the lever 31 is rotated counter clockwise to high power output position. When the lever 31 is rotated in a clockwise direction to a predetermined setting, it engages an idle detent 38 and acts through an engine driven governor, not shown, to position a feed valve, also not shown, and maintain the fuel feed at a predetermined idling rate; and if it is rotated further in a clockwise direction, it engages a socalled locked poppet detent 39, at which point the feed valve is under direct manual control free of the governor. Further rotation in a clockwise direction brings the said lever 31 to a fully closed fuel cut-off position.

A fuel tank is indicated at 40, and leading from this tank is a fuel conduit 41, having a boost pump 43 therein, which may be of the electric type controllable from a remote point such as the pilot's compartment. Conduit 41 communicates with a conduit 42 having an engine driven pump 44 mounted therein; the latter having an in-built by-pass not shown, with a by-pass valve set to maintain the delivery pressure within a predetermined value. The pump 44 delivers into either or both branch conduits 42' and/or 42" through a check valve 98.

A metering valve of the dashpot type is generally indicated at 110; it includes a cylinder 110', having a piston 111 slidably mounted therein and carrying a metering pin or valve 112, adapted to control the area of a metering orifice 113. A spring 114 normally urges the pin or valve 112 to its retracted position; inward movement (valve closing movement) resulting from admission of fuel under pressure into chamber 115 in a manner to be described. The fuel to be metered enters a chamber 116, then flows thru orifice 113 and into outlet chamber 117.

A main starting by-pass conduit 118 has its inlet connected to the fuel conduit 42"; it conducts fuel to the chamber 116 by way of branch conduit 118'. From chamber 116 the fuel is metered into the chamber 117 and thence through conduit 120 to the main fuel conduit 29 and the manifold 26. Preferably, but not necessarily, a pressure reducing valve, shown diagrammatically at 121, is provided to maintain a predetermined pressure on the starting fuel flowing to the starting system.

A conduit 119 receives starting fuel from conduit 118 and discharges such fuel into an accumulator, generally indicated at 176 and shown more or less in detail in Figure 4. The purpose of the accumulator is to store or retain a certain quantity of starting fuel until the pressure in manifold 26 attains a predetermined value, and then discharge such fuel through the starting nozzles 24 and 25 by way of conduits 175' and 48 and branch conduits 49 and 50. The accumulator will be more fully hereinafter described in conjunction with Figure 4.

The pressure of the starting fuel passed by the accumulator 176 is communicated to the chamber 115 of the metering valve 110 by way of conduits 131 and 131', causing the metering pin or valve 112 to move to the left against the resistance of calibrated spring 114 and restrict orifice 113. The initial degree of restriction of the orifice 113 should permit a flow of fuel to the fuel manifold 26 by way of conduits 120 and 29 such as will produce sufficient discharge of fuel from the burner nozzles 18 to ensure ignition and flame propagation when flame is communicated thereto from the starting burners. Then when the pressure in chamber 115 is reduced due to a decrease in discharge pressure at the starting nozzles 24 and 25, the calibrated spring 114 retracts the said metering pin or valve 112 and progressively increases the area of orifice 113 and hence the rate of discharge from all the burner nozzles as the engine accelerates to a predetermined speed for change-over of fuel metering to the main fuel control 30.

Means are provided for modifying the rate of opening movement of the metering pin or valve 112 (and hence the rate of fuel feed during the starting period following ignition) as a function of the pressure and temperature of the air flowing to the compressor or engine and also as a function of compressor discharge pressure, an example of such means being illustrated in Figure 3 by the detailed showing of a casing member 133. Referring to the latter figure, check valve 143 in passage 145 prevents back flow of fuel through said passage when piston 111 of valve assembly 110 starts its movement to the right under the influence of spring 114. Back flow must then be across variable orifices 135 and 139 in passages 136 and 140. The area of orifice 135 is controlled by a needle valve 134, carried by the movable end of a bellows or aneroid 132, mounted in a casing or housing 132', said bellows being loaded for a pressure and temperature response and located where it will be subjected to compressor inlet pressure and temperature. The area of orifice 139 is controlled by a needle valve 138, carried by the movable end of a bellows 137, mounted in a casing or housing 141, said latter bellows being loaded for a pressure response and subjected to compressor discharge pressure.

A pair of spark plugs are diagrammatically illustrated at 58 and 59 and their coacting spark coils at 60 and 61, the latter usually comprising primary and secondary coils together with a made-and-break device functioning to provide a high voltage to the spark plugs from a low voltage source, such as a battery 156. Only one spark plug and coacting starting nozzle need be employed if desired, since once one of the burners is ignited the flame will spread through outer and inner crossover tubes, indicated at 56 and 57 in Figure 1, to the remaining burners, and it will also spread by way of the nozzle diaphragm 19. However, by having two spark plugs and pilot burners equally spaced or about 180° apart, the time required for the flame to spread to all the burners is reduced. The spark coils 60 and 61 are electrically connected in series by a wire 62, which in turn connects with the battery 156 by wires 63, 157, 154 and control switch 155. Since the conduit 118 should be closed at times other than during the starting cycle, it is provided with a port 151, which is controlled by a normally-closed solenoid valve 150, having a coil 152, electrically connected by wires 153 and 154 and switch 155 with the battery 156.

The valve indicated at 92 is a drip valve; as here shown, it is of the normally-open electric type. Drip valves are usually connected at the low point of the fuel manifold ring to provide a drain for fuel which would otherwise remain in the manifold after the engine has been stopped and fuel flow cut off. In the present instance, the valve 92 is spring-urged toward open position and is closed during starting through energization of solenoid 93 when switch 155 is closed; its construction is such that it is thereafter held closed while the engine is in operation, due to pressure build-up in the fuel system, even though its solenoid coil is deenergized and remains closed until the engine is shut down, whereupon fuel pressure is relieved and it is automatically opened by spring force.

As a safety or emergency precaution, the engine-driven pump 44 may be by-passed by a conduit 94, pump 95 and conduit 96 provided with a check valve 97, the pump 95 usually being controlled from the pilot's compartment. Check valve 98 prevents back flow or pressure build-up through pump 44 when emergency pump 95 is in operation.

Referring now to Figure 4, the accumulator 176 comprises a spherical shell 176', containing a bladder 177 of flexible material such as rubber. The shell may be charged with air or other suitable fluid through an air valve, generally indicated at 178, the said shell being connected to a base member 179 and the bladder having a bead gripped at 180 and another bead at 181. The base member 179 is provided with a chamber 182, over which lies a porous combined filter and heating element 183. An annular seal 183' is preferably located between the base 179 and the bead-engaging member superimposed thereon. Beneath the base member 179 is a piston 184, adapted to slide on guide surfaces 185' and 186' projecting inwardly from end combined seal plates and pipe fittings 185 and 186, which are secured to the said base member. The piston 184 is adapted to move to the left against the resistance of a salibrated spring 187; it is formed with a passage 188, for communicating charging pressure to the bladder 177, and a bleed 189, for exhausting pressure from the chamber therebelow. At the right of the piston is a chamber 190, to which back pressure fuel may pass through a port or passage 191 from an inlet chamber 192. The entire accumulator assembly is supported on a main base 194. A pair of poppet valves are indicated at 195 and 196; they are normally urged in opposite directions towards seated position by a spring 197. The valve 195 is formed with a passage 195' and is adapted to seat at port 198, while the poppet valve 196 is formed with a passage 196' and is adapted to seat at ports 199 and 200.

Operation

To start at ground level, the boost pump 43 and auxiliary pump 95 are turned on, the starter engaged and the engine cranked to about 1000 R. P. M. with the control lever 31 in cut-off position. The ignition switch 155 is then closed, which actions starts sparking at the spark plugs 58 and 59, closes the drip valve 92 and opens solenoid valve 150. Since the needle 112 is now at least partially retracted, fuel will flow across the metering valve 110 to conduit 29 and the manifold 26, the reducing valve 121 limiting the pressure in the starting line upstream of said metering valve to a predetermined value; and fuel will also flow to the accumulator and charge the latter. During the charging cycle, fuel enters the passage 192 (Fig. 4) and thence flows through port 198, passages 195' and 196', port 199, passage 188 to chamber 182 and through porous disc and heating element 183 to the bladder 177, which inflates until a predetermined pressure is attained which in the present instance may be pump pressure or the pressure in conduit 119 downstream of the valve 121, the spring 187 maintaining the piston 184 to the right with the valve 196 seated at 200 and barring flow of fuel to the conduit 175'.

When the fuel flowing to the manifold causes the manifold pressure to attain a value of, for example, 30 p. s. i., the back pressure in chamber 190 acts on the right hand surfaces of the valve 196 and piston 184 and first causes the piston 184 to move to the left and close port 199, preventing further flow to the accumulator through the passage 188, and as the back pressure increases, the valve 196 is moved to the left and the port 200 opened, permitting the accumulator to discharge fuel into the conduits 175' and 48 and thence to the starter nozzles 24 and 25, the accumulator discharging a predetermined quantity of fuel sufficient for starting purposes. During this discharging period when combustion is established in the starting burners, the same pressure is also applied to the piston 111 of the metering needle 112 and the latter moves to the left to restrict orifice 113 such that sufficient fuel will pass to the manifold 26 to produce enough pressure at the burner nozzles 18 to permit ignition and flame propagation when flame is communicated thereto from the starting burners; but after the accumulator discharges and combustion takes place in the starting burners, the pressure in lines 48 and 131 drops to approximately manifold pressure and the needle 112 begins to retract and meter fuel at a rate determined by engine speed and/or air density (see Fig. 3). After the engine has been brought up to a speed such as to permit control by the unit 30, the lever 31 is moved to idle position and the switch 155 is opened and solenoid valve 150 closes, thereby shutting off the starting system. It should be noted that when the port 200 (Fig. 4) opens slightly, there is a build-up in pressure in chamber 190 which causes the piston 184 to "snap" to the left and the accumulator to discharge at a substantially constant pressure. The accumulator recharges when the manifold pressure again drops to a predetermined value, say 15 p. s. i.

To restart in flight, it is only necessary to move the control lever 31 to cut-off position until the manifold pressure drops below 15 p. s. i.; then turn on the ignition switch 155.

In extremely cold weather, difficulty is sometimes experienced in atomizing the cold fuel sufficiently to obtain a prompt start, particularly where the fuel is of a relatively low volatile nature such as kerosene. Accordingly, the combined filter and heating element 183 is provided with electric terminals 201 and 202, having circuit wires connected thereto which may lead to the main electric circuit so that the element may be properly heated whenever the temperatures are such as to justify heating of the starting fuel. The accumulator of Figure 4 is considerably enlarged to show relatively small parts. Obviously, the quantity of fuel for starting purposes in certain types of engines would require a relatively small accumulator, so that the heating element 183 would have ample capacity to bring the fuel to the desired starting temperature within a relatively short time.

It will be understood that no attempt has been made herein to enumerate all of the advantages of the improved starting system or to state the various alternative methods of operation. The drawings and description matter should therefore not be considered as limiting the invention, the scope of the latter being defined by the appended claims.

I claim:

1. In a fuel supply starting system for a gas turbine engine having a combustion zone, a plurality of fuel nozzles arranged to discharge fuel under pressure into said zone for admixture with air for effecting combustion, at least one of said nozzles functioning as a starting nozzle, fuel ignition means for igniting the fuel discharged from said starting nozzle, a fuel manifold common to all of said nozzles including the starting nozzle, a main fuel control device for controlling the power output of the engine, a starting fuel conduit for conducting starting fuel to the starting nozzle independently of the manifold, means for metering fuel at a controlled rate to the fuel manifold during the starting period to gradually build up a controlled pressure in the manifold as the engine attains idle speed, and a fuel accumulator device connected with said starting fuel conduit, valve means connected to said starting fuel conduit and said accumulator device for charging said accumulator device with fuel when manifold pressure is below certain predetermined value, and for discharging fuel from said accumulator device to the starting nozzle when the manifold pressure is greater than said predetermined value.

2. A fuel supply and starting system as claimed in claim 1 containing a device responsive to pressure downstream of said accumulator device for controlling the means for metering fuel as a function of fuel pressure to the starting nozzles.

3. A fuel supply and starting system as claimed in claim 1 containing a device responsive to engine operating speed for controlling the means for metering fuel as a function of engine speed.

4. A fuel supply and starting system as claimed in claim 1 containing a device responsive to air density for controlling the means for metering fuel as a function of the density of the air flowing to the engine.

(References on following page)

References Cited in the file of this patent

UNITED STATES PATENTS

| | | | |
|---|---|---|---|
| 795,889 | Billinghurst | Aug. 1, | 1905 |
| 1,269,989 | Williams | June 18, | 1918 |
| 1,757,855 | Chilowsky | May 6, | 1930 |
| 1,820,612 | Good et al. | Aug. 25, | 1931 |
| 2,073,847 | Miller | Mar. 16, | 1937 |
| 2,199,454 | Andler et al. | May 7, | 1940 |
| 2,232,419 | Warwar | Feb. 18, | 1941 |
| 2,252,556 | Crosiar | Aug. 12, | 1941 |
| 2,511,848 | Hill | June 20, | 1950 |
| 2,555,445 | Hooker et al. | June 5, | 1951 |
| 2,581,275 | Mock | Jan. 1, | 1952 |
| 2,670,033 | Ray | Feb. 23, | 1954 |